United States Patent
Inami et al.

(10) Patent No.: US 6,283,598 B1
(45) Date of Patent: *Sep. 4, 2001

(54) METHOD OF AND APPARATUS FOR DISPLAYING AN IMAGE

(75) Inventors: Masahiko Inami, Tokyo; Naoki Kawakami, Tottori; Yasuyuki Yanagida, Tanashi; Taro Maeda, Tokyo; Susumu Tachi, Tsukuba, all of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,374

(22) Filed: Jan. 26, 1999

(30) Foreign Application Priority Data

Jun. 19, 1998 (JP) .................................................. 10-172722

(51) Int. Cl.[7] .................................................. G03B 21/00
(52) U.S. Cl. .............................................. 353/31; 359/451
(58) Field of Search ...................................... 359/618, 625, 359/626, 627, 630, 632, 636, 451; 353/31

(56) References Cited

U.S. PATENT DOCUMENTS 3,200,702   8/1965   Giordano ................................. 88/24
5,908,300 * 6/1999   Walker et al. ......................... 434/43

OTHER PUBLICATIONS

Proposal for the Object Oriented Display: The Design and Implementation of the MEDIA[3], ICAT '97, by Naoki Kawakami, Masahiko Inami, Taro Maeda, and Susumu Tachi, published Dec. 3, 1997.

* cited by examiner

Primary Examiner—Safet Metjahic
Assistant Examiner—E P LeRoux
(74) Attorney, Agent, or Firm—Sidley Austin Brown & Wood

(57) ABSTRACT

A pair of projectors are arranged for projecting an image. These projectors are disposed in optically conjugate relationship with the observer's eyes respectively. An image of an object to be viewed by the observer is projected from the projectors and is allowed to appear on a screen, the shape of which corresponds to that of the object.

11 Claims, 6 Drawing Sheets

1 APPARATUS FOR DISPLAYING AN IMAGE

METHOD OF AND APPARATUS FOR DISPLAYING AN IMAGE

BACKGROUND OF THE INVENTION

This application is based on Japanese Patent Application No. 172722/1998 filed on Jun. 19, 1998, the contents of which are incorporated herein by reference.

1. Field of the Invention

This invention relates to an apparatus for displaying an image, and in particular the invention concerns itself with the art of virtual reality or computer visualization which includes projecting an image on a screen, the shape of which is optional, and presenting the object on the screen so as to afford an interactive environment to the observer.

2. Description of the Prior Art

In recent years, notable progress has been made in the field of a system for producing virtual reality. Various types of head-mounted displays (HMDs) have been proposed and manufactured as one of the new apparatuses for presenting visual information in a virtual space. Each of the HMDs includes a display apparatus arranged around the observer's head.

Another new apparatus of the kind indicated above is of a projection type and is constructed so as to allow an image to appear on a flat rectangular screen by means of a projector. A system of this type is disclosed in U.S. Pat. No. 3,200,702. This type of apparatus designed to enable a plurality of observers to view an image simultaneously makes it possible to view a proper image from more places.

It has been the purpose of either of the aforesaid prior art apparatuses to present a virtual "space" per se. It is contemplated, however, that they will be found even more advantageous when used in doing some work in the virtual space. For this purpose, the presentation of a virtual "object" appears even more important than the presentation of the virtual "space" per se.

In order to make the virtual object true to nature, it is necessary for the observer to exert an influence on the image in an interactive manner. Input means heretofore used for this purpose have taken the form of input devices separated from screens. These input devices have the disadvantage that, because of a discord between the position of the image presented and the position in which manual input procedures are carried out, the aforesaid input devices fail to let the observer feel as if he or she were manipulating the virtual object presented on the screen.

An attempt has been made to obtain the measurement values representing the position of a hand or hands of a person putting on an HMD and manipulating a visually presented object. The aim of this measurement is to allow the position of the hand or hands to agree with the position of the object. Even in this case, the observer cannot obtain the sense of holding the object with a tactile sensation.

According to still another prior proposal made to cope with the aforesaid problem, measurement values representing the position and attitude of an object presented on a display screen are obtained with a view to manipulating the object. A small-sized cathode ray tube or liquid crystal display is used as an apparatus of the kind indicated above. It is found that the flat display screen makes it difficult to attain a happy blending of visual and tactile sensation, which are of importance to the space recognition of human beings.

SUMMARY OF THE INVENTION

The present invention is concerned with eliminating the aforesaid difficulty. As such, the primary object of the invention is to provide a method of and an apparatus for displaying an image in such a manner as to present a virtual object to an observer.

According to the preferred embodiment of the present invention, as shown in FIG. 1, the invention consists in the provision of a method which includes the step of arranging a pair of projectors 14L and 14R for projecting an image. These projectors 14L and 14R are disposed in optically conjugate relationship with the observer's eyes respectively. The method further includes the steps of projecting from the projectors 14L and 14R an image HG of an object to be viewed by the observer BS, and allowing the image HG to appear on a screen 11, the shape of which corresponds to that of the object.

Preferably, the shape of the screen 11 is the same as, or approximate to, the shape of the object. A flat or curved surface and a closed-curved surface such as a spherical surface or an oval are merely representative of any of a large number of shapes which can be taken by the screen 11.

DESCRIPTION OF THE PREFERRED EMBODIMENTS

Figure 1:
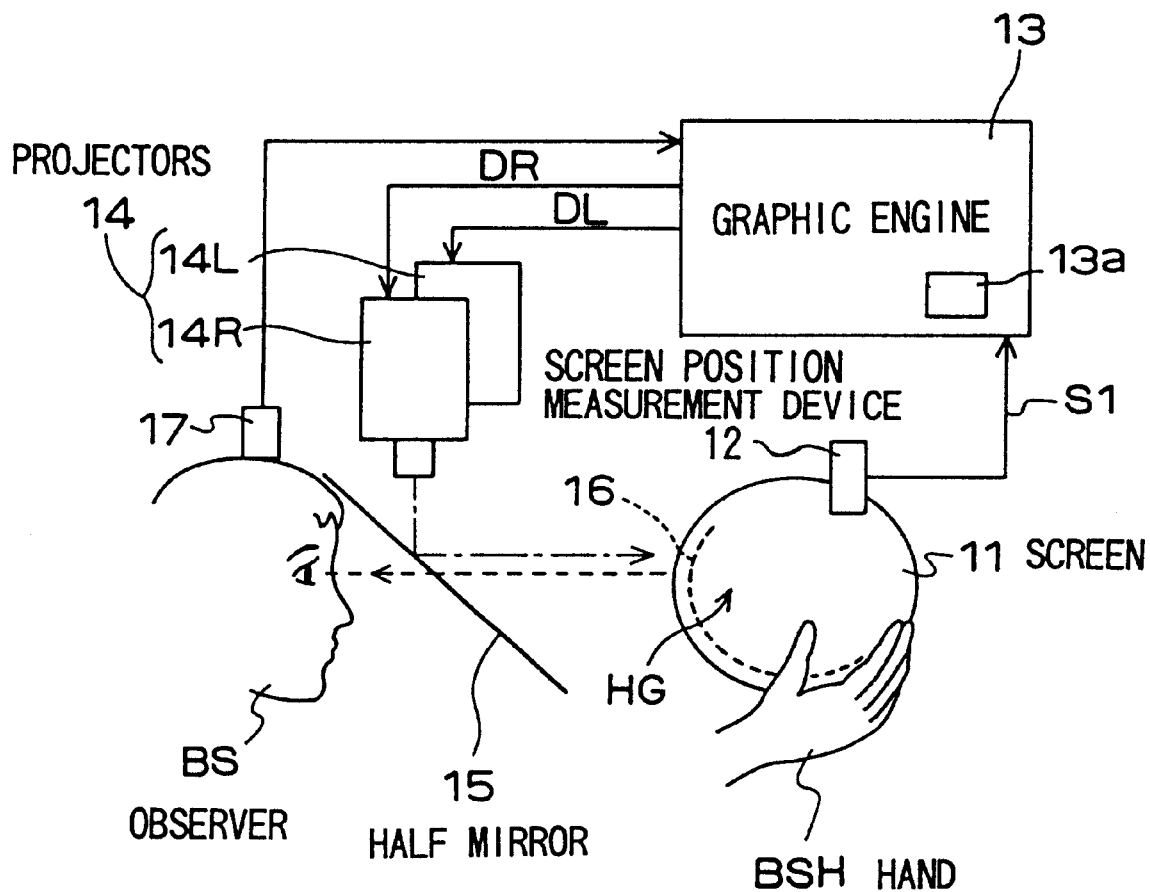
FIG. 1 is a view showing the component parts of a preferred embodiment of the present invention.
Figure 2:
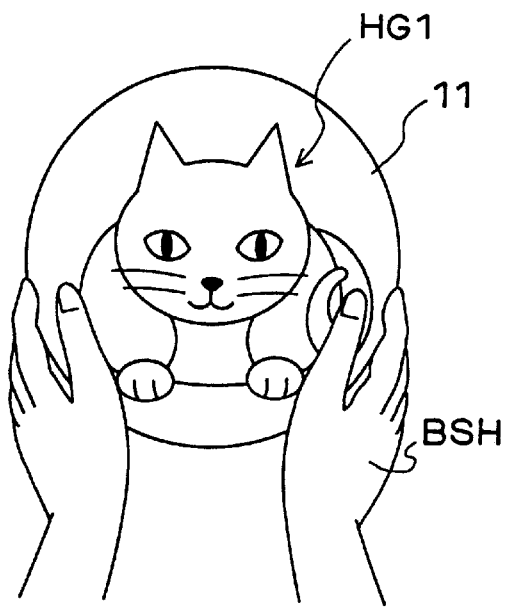
FIG. 2(A) and FIG. 2(B) provide diagrammatic illustrations of an example of an object to be presented thereby.
Figure 2:
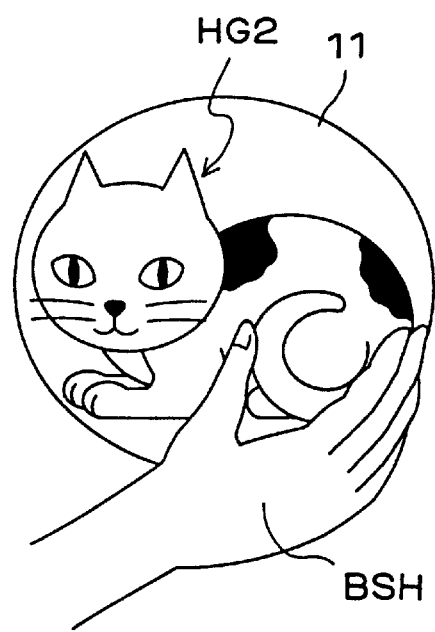
Figure 3:
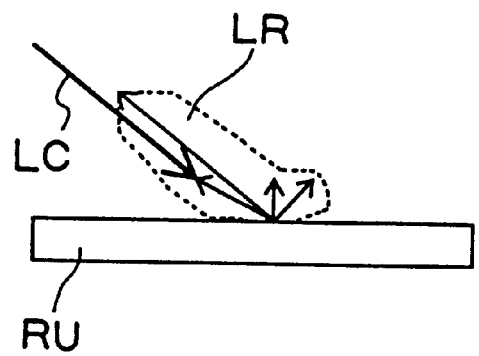
FIG. 3(A) and FIG. 3(B) are views to help explain how the light beams are reflected on the surfaces of a retroreflector and a conventional screen respectively.
Figure 3:
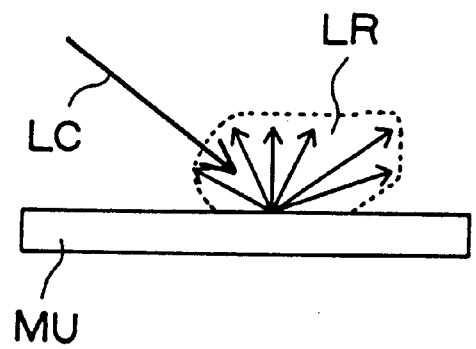
Figure 4:
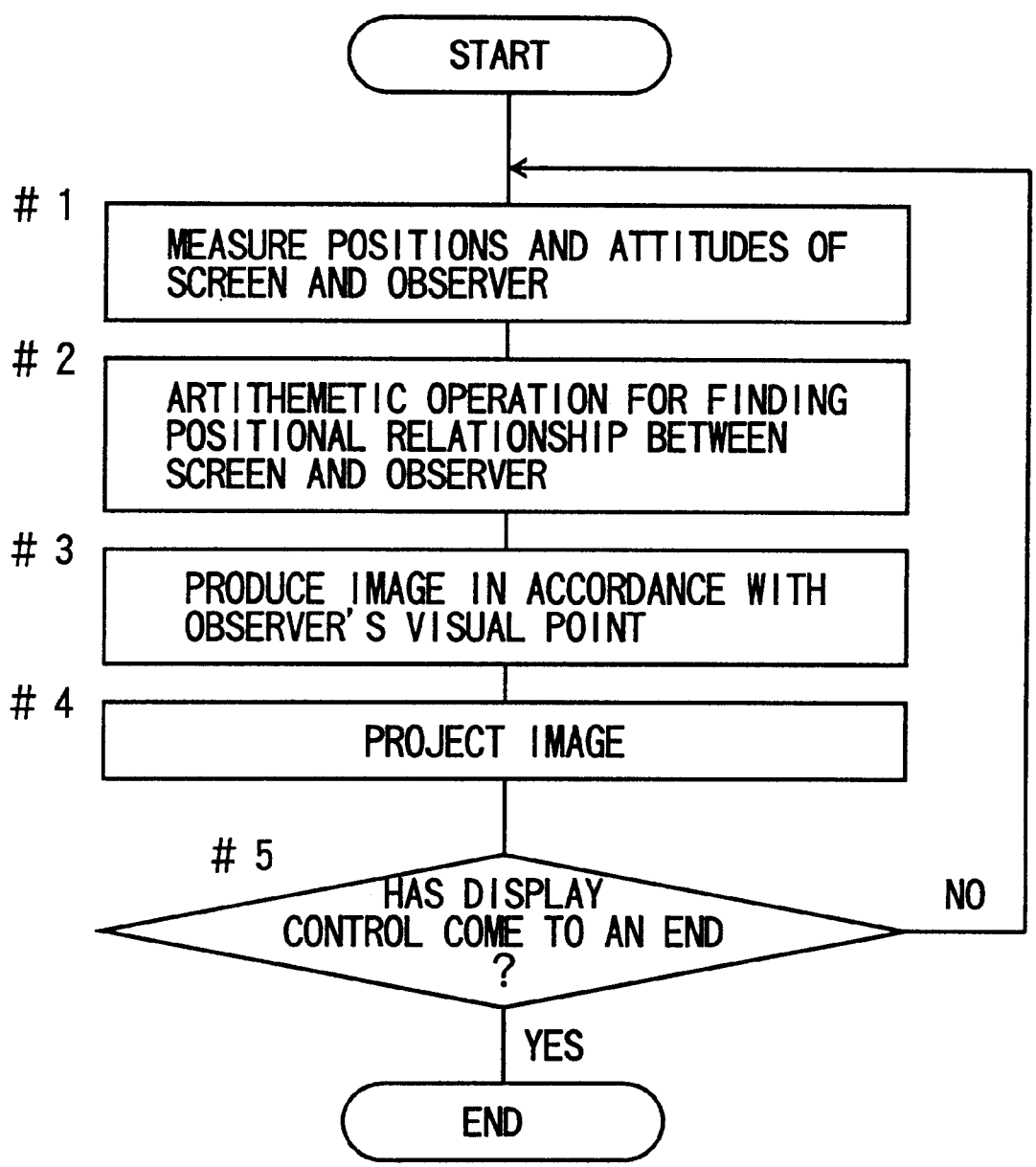
FIG. 4 is a flow chart representing successive steps in a typical practice of display control.

FIG. 1 is a view showing the component parts of a preferred embodiment of the present invention, FIG. 2(A) and FIG. 2(B) provide diagrammatic illustrations of an example of an object to be presented thereby, FIG. 3(A) and FIG. 3(B) are views to help explain how the light beams are reflected on the surfaces of a retroreflector (A) and a conventional screen (B) respectively, and FIG. 4 is a flow chart representing successive steps in a typical practice of display control.

Referring now to FIG. 1, an apparatus 1 for displaying an image comprises a screen 11, a screen position measurement device 12, a graphic engine 13, projectors 14L and 14R, a half mirror 15, a device 16 for developing the sense of force, and a head position measurement device 17.

An image HG to be presented to an observer BS is projected by the projectors 14L and 14R and is allowed to appear on the screen 11. Although the shape of the screen 11 is not necessarily critical but is a matter of preference, the most favorable result will of course be obtained from a shape which is the same as, or approximate to, the shape of the object to be presented by the image HG. However, for ease and economy of manufacture, the screen 11 may be of any shape such as a flat or curved surface or a closed-curved surface on condition that it is relevant to the shape of the object. For example, FIG. 1 is based on the assumption that the screen 11 is an oval-shaped body which is a kind of a closed-curved surface.

Preferably, the screen 11 is made up of a light material such as styrofoam which is easy to be processed into any shape. The outer surface of the screen 11 is coated with retroreflective paint containing glass beads or the like. Alternatively, the screen 11 may be covered, with white cloth. As a further alternative, if the screen 11 has a white and smooth surface, it need not be coated or covered with anything.

As shown in FIG. 3(B), light beams LR reflected from the surface of an ordinary material MU are diffused in all directions substantially independent of an angle at which a light beam LC is incident on the surface of the material MU. By contrast, it will be seen from FIG. 3(A) that the greater part of light beams LR reflected from the surface of a screen made up of a retroreflective material RU are oriented against a direction in which a light beam LC is incident on the surface of the material RU. For this reason, an image projected on the screen 11 coated with retroreflective paint is superior in lightness.

Thus the unique feature of the retroreflective material RU is that it acts as a device for restricting the flow of the greater part of reflected light beams in the opposite direction to a direction in which a light beam is incident thereon. This feature is derived from the utilization of a corner-cube array, glass beads or the like. It will be understood that a traffic sign and the rear reflector of a bicycle are merely representative of various cases which are exemplary of the utility of the retroreflective material RU.

Referring again to FIG. 1, the position and attitude of the screen 11 in the three-dimensional space are measured by the screen position measurement device 12. A conventional magnetic sensor may be suitable for use as the screen position measurement device 12 for measuring the position coordinates and attitude of the screen 11 in real time. As this specification proceeds, there are some cases where the expression "position" is used as a general term for both the position and the attitude.

The head position measurement device 17 mounted on the head of observer BS transmits a signal to the graphic engine 13 when the former has measured the position of the observer's head, i.e., the positions of his or her eyes and the directions in which the visual axes of the observer's eyes are bound. The graphic engine 13 performs arithmetic operations for finding the positional relationship between the screen 11 and the observer BS and thereby finding the visual point of the observer BS viewing the object.

A relative position measurement device, which is a combination of a magnetometer and the source of a magnetic field, may be formed to include both the head position measurement device 17 and the screen position measurement device 12 so that the positional relationship between the screen 11 and the observer's head may be found at a time.

The device 16 for developing the sense of force is incorporated in the screen 11 and functions as a means for developing the sense of force to be perceived by the observer BS in accordance with an image projected on the screen 11. In order to develop weight sensation, for example, the screen 11 is pulled downwardly so as to let the observer's hands experience a downward force upon them with magnitude corresponding to the virtual weight of the object. In such a case, a mechanism in the form of a combination of wire or linkage and an actuator such as a motor may be suitable for use as the device 16. Among other examples of the sense of force, there may be mentioned the sense of kick perceived when a gun is discharged, the sense of viscosity perceived when an object is moved in a viscous fluid, the sense of sway perceived when an object is swayed by the wind, and the sense of force perceived when a virtual ball dashed against a virtual wall rebounds against the observer. Thus the device 16 permits the observer BS to have bodily sensation with respect to an image of an object projected on the screen 11.

A sensor by which the force applied to the screen 11 is detected in real time may be provided. This sensor detects the force applied by the observer's hands BSH taking hold of the screen 11. The image projected from the projectors 14 is corrected in accordance with the magnitude of the force and the position in which it is applied.

The graphic engine 13 produces image information DL and DR for projectors 14L and 14R respectively and delivers it thereto. For the oval-shaped screen 11 shown in FIG. 1, a three-dimensional image of a substantially oval-shaped object such as a cat, rabbit or squirrel is produced from two pieces of image information DL and DR, each of which is capable of producing a two-dimensional image viewable from any visual point.

More specifically stated, the graphic engine 13 produces image information DL and DR which is corrected from time to time so that a suitable image may be displayed on the screen 11 in accordance with the visual point of the observer BS viewing the screen 11. Every time the positions of the screen 11 and/or the observer BS have changed, the contents, shape and position of the image projected from the projectors 14L and 14R are also changed. For example, let it be assumed that an image appearing on the screen 11 represents an object at which the observer BS looks in a front view and that the screen 11 is thereafter rotated through 90° about a vertical axis. Then the contents of the image change. A new image appearing on the screen 11 now represents the object of which the observer BS takes a side view.

As seen more particularly in FIG. 2(A), an image HG1 projected on the screen 11 represents a cat, at which the observer BS looks in a front view. The screen 11 is thereafter rotated, then, as shown in FIG. 2(B), a new image HG2 appearing on the screen 11 now represents the cat of which the observer BS takes a side view.

A parallax imparted to the image information DL and DR to be transmitted to the projectors 14L and 14R respectively may be regarded as suitable for allowing the observer BS to have a stereoscopic vision of the image projected on the screen 11.

An image processor such as a microcomputer, personal computer or workstation may be suitable for use as the graphic engine 13. In producing the image information DL and DR, the graphic engine 13 employs a data base for searching for data on the shapes of objects, data and a program needed for executing computer graphics, software for rendering graphics, and other control programs. The numeral 13a refers to an image editor.

The monocular, small-aperture projectors 14L and 14R have an identical construction with each other and are allotted to the left and right eyes respectively of the observer BS. As this specification proceeds, there are some cases where the expressions "projector 14" and "projectors 14" are used as synonyms for either and both, respectively, of the projectors 14L and 14R.

In order to allow an image to have large focal depth, it is desirable to make the aperture of each projector 14 as small as possible. Therefore, it is contemplated that the aperture should be as small as 5 cm or less, 2 cm or less, or even 1 mm or less.

The projectors 14 are disposed in optically conjugate relationship with the observer's eyes respectively. Preferably, the projectors 14 are mounted on the observer's head together with the half mirror 15. If the projectors 14 are not properly positioned on the observer's head, the image information DL and DR has to be corrected in the graphic engine 13. Such correction needs much time and is troublesome.

In order to mount the projectors 14 on the observer's head, an assembly of the projectors 14, the half mirror 15 and head position measurement device 17 may be mounted on a cap or a helmet to be worn by the observer BS. Alternatively, the observer may have the aforesaid assembly chin-strapped as is the case with an HMD.

Although the half mirror 15 reflects light beams projected from the projectors 14, light beams reflected on the surface of the screen 11 are allowed to pass through the half mirror 15, by virtue of which the projectors 14 are disposed in optically conjugate relationship with the observer's eyes respectively, and the observer BS can view an object presented on the screen 11.

For a more complete understanding of the successive steps in the display control, reference may be had to FIG. 4.

The positions of the screen 11 and the observer BS are measured by the screen position measurement device 12 and the head position measurement device 17 respectively (step 1). Arithmetic operations are performed by the graphic engine 13 for finding the positional relationship between the screen 11 and the observer BS (step 2). Image information DL and DR is produced on the basis of the results of the arithmetic operations and in accordance with the visual point of the observer BS viewing the screen 11 (step 3) and is projected from the projectors 14 (step 4).

With the preferred embodiment of the inventive apparatus 1 as hereinabove disclosed, the observer BS can view a distortionless, high-contrast and highly luminous image from various visual points irrespective of the positions of the screen 11 and/or the observer BS as long as the screen 11 is disposed in a range in which the projectors 14 can project an image thereon. The observer BS can have a stereoscopic vision of the image by the naked eyes when light beams reflected from the surface of the screen 11 are oriented with high accuracy against a direction in which a light beam is incident on the surface of the screen 11.

The image appearing on the screen 11 represents a virtual object, which responds to the shifting movement, rotation, grasp or squeeze of the screen 11 effected by the observer's hands BSH. Consequently, the observer BS can feel the realness of the virtual object.

Even if there is a certain measure of difference between the shape of the object and that of the screen 11, the fact that the observer BS can have a stereoscopic vision of the object makes the presentation of the object effective. A particular advantage obtained from the stereoscopic vision resides in the fact that the seams and stains on the screen 11 do not show.

When a portion of the screen 11 is hidden behind the observer's clothing or hands BSH, an image projected on the clothing or hands BSH can hardly be seen because they are much inferior in lightness to the screen 11 coated with retroreflective paint. The image appearing on the remaining, i.e., unhidden, portion of the screen 11 is so sharply defined as to produce an illusion that the projectors 14 are disposed at the rear of the screen 11.

If the shape of the screen 11 agrees with that of the object, innate desire for touching an object of observation is more naturally satisfied.

Even a flat screen 11 may be used for a general-purpose display apparatus. In this case, manipulation of an image appearing on the screen 11 allows the observer BS to feel as if he or she were manipulating an object put in a box.

The observer's hands BSH carry the weight of the screen 11 alone. The importance of this fact is particularly great on account of the realization of a lightweight display apparatus.

A particular advantage obtained from the projectors 14 disposed in optically conjugate relationship with the observer's eyes resides in the fact that the image presented on the screen 11 stands comparison with an image projected on an ordinary flat screen at a proper angle of projection. This advantage is obtained independent of the shape and position of an object to be projected and an angle of projection at which the object is projected on the screen 11.

As has been above explained, an image projected on the screen 11 coated with retroreflective paint is superior in lightness, and the small aperture of each projector 14 allows an image to have large focal depth. Consequently, sufficient luminosity of the screen is obtained in the indoor brightness in the daytime even if a sufficient amount of light is not obtained from a light source. A combination of the screen 11 and the projectors 14 of the type indicated may obviously be applied to a window for use in projecting an image in a desired position in a real space.

Some of the retroreflective materials are such that light beams reflected from the surfaces thereof are oriented with especially high accuracy against a direction in which a light beam is incident on the surface of each material. Since these materials serve as phase conjugate mirrors, it is possible to form a phase conjugate image in a position other than the surface of the screen 11. For this purpose, the focuses of the projectors 14 have only to be adjusted.

By providing a room with all internal surfaces constructed as the screens 11, it is also possible to allow the observer BS to be completely immersed in the virtual environment.

Figure 5:
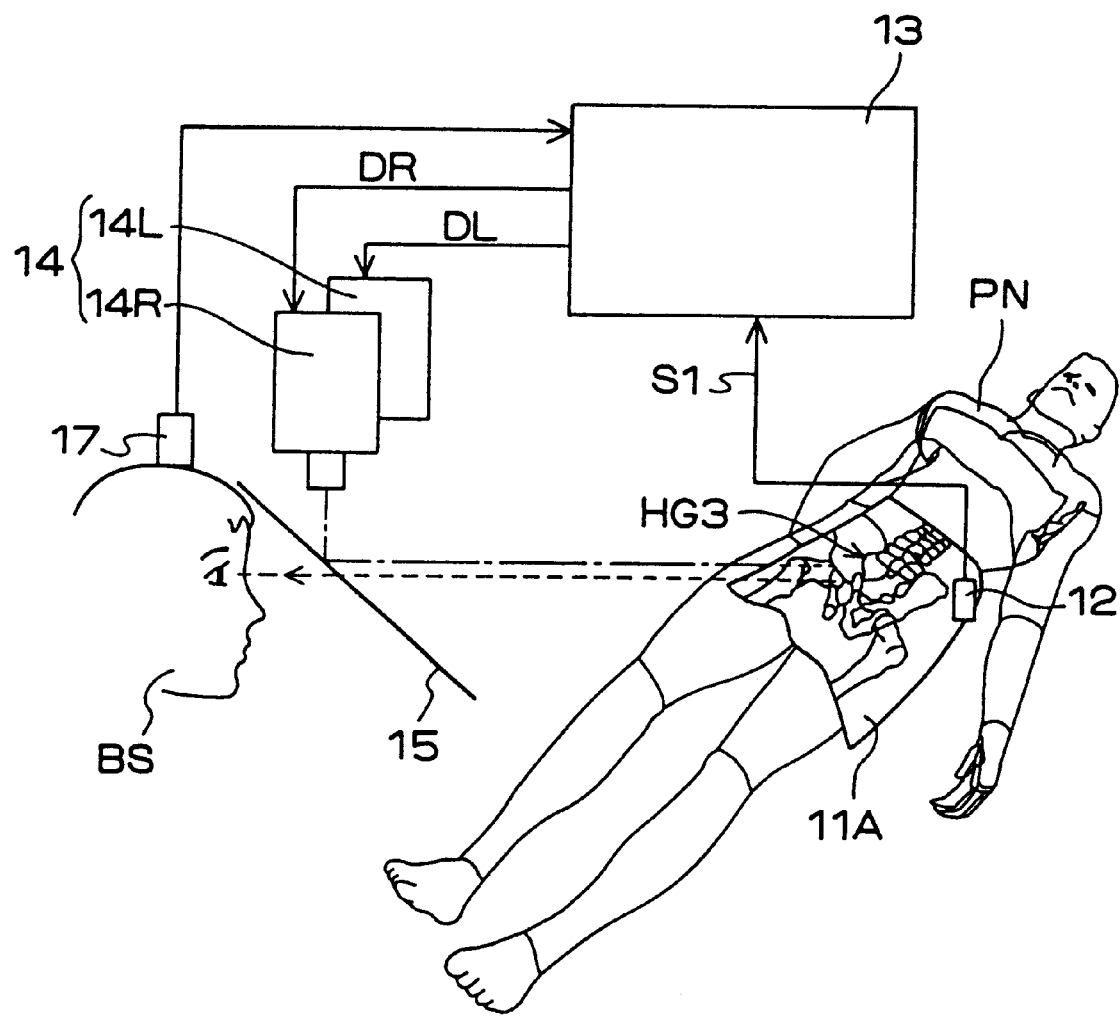
FIG. 5 is a view showing the component parts of another embodiment of the present invention.

Referring now particularly to FIG. 5, there is shown a modified form of the present invention. Like numerals are employed to designate like parts in both FIGS. 1 and 5, where the apparatuses 1 and 1A respectively are depicted.

A cloth-like screen 11A and the screen position measurement device 12 are mounted on the abdominal region of a patient PN. On the screen 11A, an X-ray picture HG3 representing an affected part of the patient PN is projected from the projectors 14. A doctor BS views the picture HG3 as if he or she were looking at the affected part per se through the fluoroscope. When the patient PN is moved, the variation of the patient's position is measured by the screen position measurement device 12 so that a new picture corresponding to the patient's new position may be projected on the screen 11A. When the doctor BS moves, the variation of the doctor's position is measured by the head position measurement device 17 so that a new picture corresponding to the doctor's new position may be projected on the screen 11A. Thereby the doctor BS can precisely determine the position of the affected part. Thus the apparatus 1A will be found particularly advantageous when used in medical treatment and surgical operations.

The apparatus 1A is adapted for use also in science education such as an exhibition in a museum.

The half mirror 15 and the monocular, small-aperture projectors 14 may be mounted on the observer's head. The image HG may be presented at any appropriate location on condition that the retroreflective material RU is stuck on the location or the location is coated with the retroreflective material RU. Such an improvised screen 11 can be of any size and shape and serves for the realization of a lightweight display apparatus.

If the surface of an input device, such as a keyboard, for entering appropriate commands in a computer system is coated with the retroreflective material RU, the keyboard per se is allowed to serve as a display apparatus. Then, customers are allowed much latitude in the key arrangement. Also, the utilization of such a keyboard as a touchpanel is made possible.

If cameras are disposed in place of the projectors 14, and if the retroreflective material with which the screen 11 or 11A is coated is such that light beams reflected from the surface thereof are oriented with especially high accuracy, the apparatus 1 or 1A will become suitable for use as a photographing apparatus.

Figure 6:
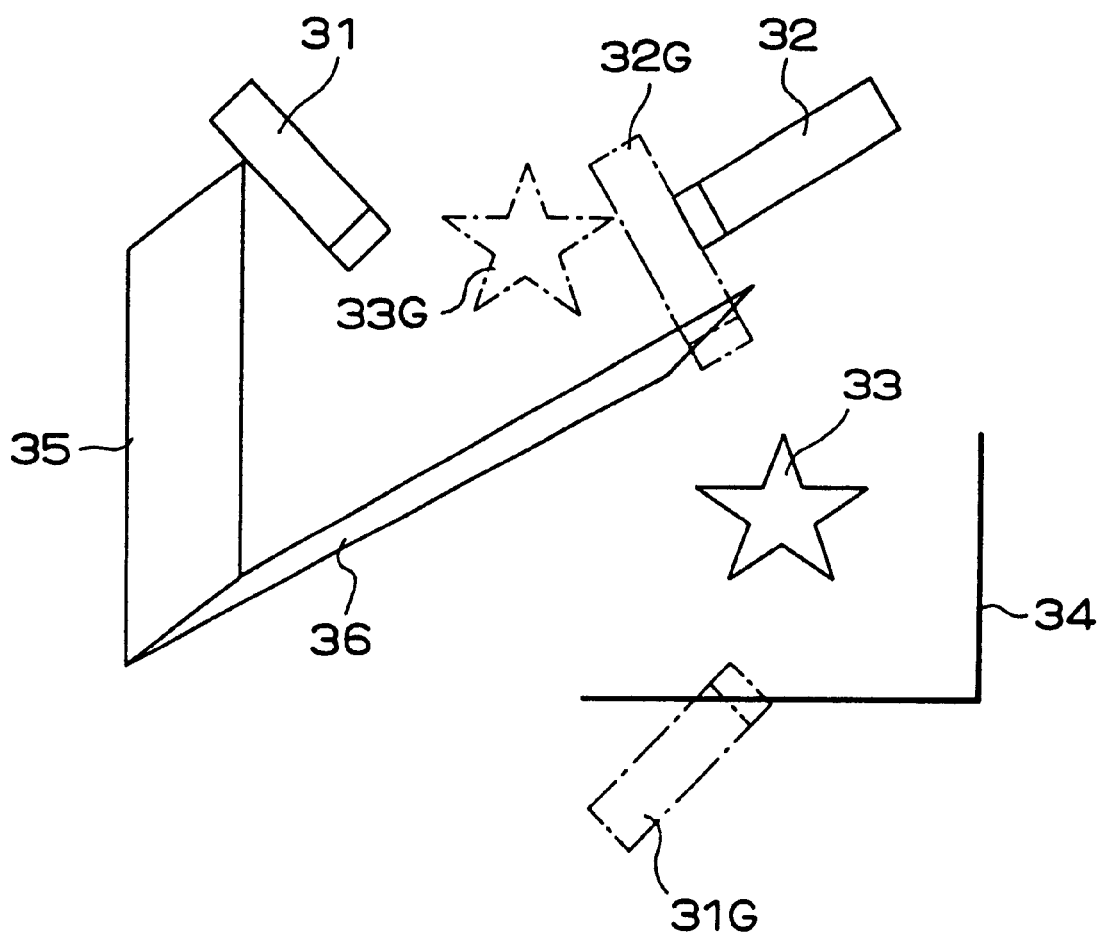
FIG. 6 provides a diagrammatic illustration of an example of a photographing device incorporating a retroreflection type opaque screen.

The rough diagram shown in FIG. 6 gives a general idea of this photographing apparatus. The formation of a phase conjugate image 33G of an object 33 is made possible by the provision of a half mirror 36 and a retroreflective screen 35. Instead of the object 33 per se, the phase conjugate image 33G can be photographed by cameras 31 and 32 when the path of light beams reflected from the object 33 to the cameras 31 and 32 is broken because of something 34 positioned therebetween. Photographing the phase conjugate image 33G by the cameras 31 and 32 is tantamount to photographing the object 33 per se by virtual cameras 31G and 32G.

Changes in the construction, shape, dimensions and material of the several parts, as well as in the data processing system design, may be made without departing from the nature and principle of the invention.

According to the embodiment mentioned above, the present invention provides a method of and an apparatus for displaying an image in order to present a virtual object to an observer. The observer can feel as if he or she were manipulating an image of an object projected on the screen.

What is claimed is:

1. A method of displaying a three-dimensional image of a three-dimensional object, comprising the steps of:
   arranging at least two projectors for projecting said three-dimensional image, said at least two projectors being disposed in an optically conjugate relationship with an observer's eyes;
   producing by said at least two projectors said three-dimensional image of a three-dimensional object to be viewed by said observer; and
   projecting said image on a three-dimensional screen, a shape of said screen being approximate to that of said object.

2. A method of displaying an image as defined in claim 1, further comprising the steps of:
   detecting a change in visual point of said observer with respect to said screen; and
   changing said image in accordance with said detected change in visual point.

3. A method of displaying an image as defined in claim 2, wherein said step of detecting includes:
   detecting a position of said screen; and
   detecting a position of the observer's head.

4. An apparatus for displaying a three-dimensional image, comprising:
   at least two projectors arranged for projecting said three-dimensional image, said at least two projectors being disposed in an optically conjugate relationship with an observer's eyes;
   an image producing device for creating said image and for transmitting said image to said at least two projectors, said image being an image of a three-dimensional object to be viewed by said observer; and
   a three-dimensional screen on which said image can be formed, a shape of said screen being approximate to that of said object.

5. An apparatus for displaying a three-dimensional image as defined in claim 4, further comprising:
   a detecting means for detecting a visual point of said observer viewing said screen; and
   an image editor incorporated in said image producing device for creating a three-dimensional image and for changing contents of said image in accordance with a change in the visual point of said observer viewing said screen.

6. An apparatus for displaying a three-dimensional image as defined in claim 5, wherein said detecting means includes:
   a screen position detector for detecting a position of said screen; and
   a head position detector for detecting a position of the observer's head.

7. An apparatus for displaying a three-dimensional image as defined in claim 4, further comprising an optical member associated with said at least two projectors such that, when head-mounted, said optical member disposes each of said at least two projectors in an optically conjugate relationship with a respective eye of said observer.

8. An apparatus for displaying a three-dimensional image as defined in claim 4, wherein said screen is a retroreflective screen.

9. An apparatus for displaying a three-dimensional image as defined in claim 4, wherein said screen is a three-dimensional body having a closed-curved surface.

10. An apparatus for displaying a three-dimensional image as defined in claim 4, wherein said screen is adapted for physical contact with said observer, said apparatus further including a device for developing a sense of force to be perceived by said observer in accordance with said object whose image is focused on said screen when said observer is in physical contact with said screen.

11. An apparatus for displaying a three-dimensional image as defined in claim 4, wherein a quantity of said at least two projectors is two.

* * * * *

UNITED STATES PATENT AND TRADEMARK OFFICE
CERTIFICATE OF CORRECTION

PATENT NO. : 6,283,598 B1  
DATED : September 4, 2001  
INVENTOR(S) : Masahiko Inami et al.

Page 1 of 1

It is certified that error appears in the above-identified patent and that said Letters Patent is hereby corrected as shown below:

<u>Title page,</u>
Item [73], Assignee:, after "Minolta Co., Ltd., Osaka (JP)", insert --, and Susumu Tachi, Tsukuba-Shi (JP) --.

Signed and Sealed this

Nineteenth Day of February, 2002

Attest:

JAMES E. ROGAN  
*Attesting Officer*     *Director of the United States Patent and Trademark Office*